(12) United States Patent
Sio et al.

(10) Patent No.: US 10,169,515 B2
(45) Date of Patent: Jan. 1, 2019

(54) LAYOUT MODIFICATION METHOD AND SYSTEM

(71) Applicant: TAIWAN SEMICONDUCTOR MANUFACTURING COMPANY LTD., Hsinchu (TW)

(72) Inventors: Kam-Tou Sio, Hsinchu County (TW); Tsung-Yao Wen, Hsinchu (TW); Chih-Ming Lai, Hsinchu (TW); Hui-Ting Yang, Hsinchu County (TW); Jui-Yao Lai, Changhwa (TW); Chih-Liang Chen, Hsinchu (TW); Chun-Kuang Chen, Hsinchu County (TW); Ru-Gun Liu, Hsinchu County (TW); Yen-Ming Chen, Hsinchu County (TW); Chew-Yuen Young, Cupertino, CA (US)

(73) Assignee: TAIWAN SEMICONDUCTOR MANUFACTURING COMPANY LTD., Hsinchu (TW)

( * ) Notice: Subject to any disclaimer, the term of this patent is extended or adjusted under 35 U.S.C. 154(b) by 0 days.

(21) Appl. No.: 14/942,927

(22) Filed: Nov. 16, 2015

(65) Prior Publication Data

US 2017/0140086 A1    May 18, 2017

(51) Int. Cl.
*G06F 17/50* (2006.01)
*H01L 21/027* (2006.01)

(52) U.S. Cl.
CPC ...... *G06F 17/5072* (2013.01); *G06F 17/5081* (2013.01); *H01L 21/027* (2013.01); *G06F 2217/12* (2013.01)

(58) Field of Classification Search
USPC .......................................................... 716/55
See application file for complete search history.

(56) References Cited

U.S. PATENT DOCUMENTS

| | | | | |
|---|---|---|---|---|
| 2007/0204253 | A1* | 8/2007 | Murakawa | G06F 17/5077 716/139 |
| 2009/0319970 | A1* | 12/2009 | Park | G03F 1/36 716/106 |
| 2012/0196230 | A1* | 8/2012 | Cho | G03F 7/70433 430/319 |
| 2013/0219353 | A1* | 8/2013 | Henrickson | G06F 17/5072 716/122 |
| 2014/0239408 | A1* | 8/2014 | Becker | H01L 27/0207 257/369 |

(Continued)

*Primary Examiner* — Mohammed Alam
(74) *Attorney, Agent, or Firm* — WPAT, P.C., Intellectual Property Attorneys; Anthony King

(57) ABSTRACT

A layout modification method is performed by at least one processor. The layout modification method includes: analyzing, by the at least one processor, allocation of a plurality of specific layout segments of a circuit cell layout to determine a first specific layout segment and a second specific layout segment from the plurality of specific layout segments; determining, by the at least one processor, if the first specific layout segment and the second specific layout segment are coupled to a first signal level; and merging, by the at least one processor, the first specific layout segment and the second specific layout segment into a first merged layout segment when the first specific layout segment and the second specific layout segment are coupled to the first signal level.

20 Claims, 8 Drawing Sheets

(56) References Cited

U.S. PATENT DOCUMENTS

| | | | |
|---|---|---|---|
| 2015/0020041 A1* | 1/2015 | Hung | G06F 17/5072 716/112 |
| 2015/0278428 A1* | 10/2015 | Wang | G06F 17/5081 716/112 |
| 2017/0140086 A1* | 5/2017 | Sio | G06F 17/5072 |

* cited by examiner

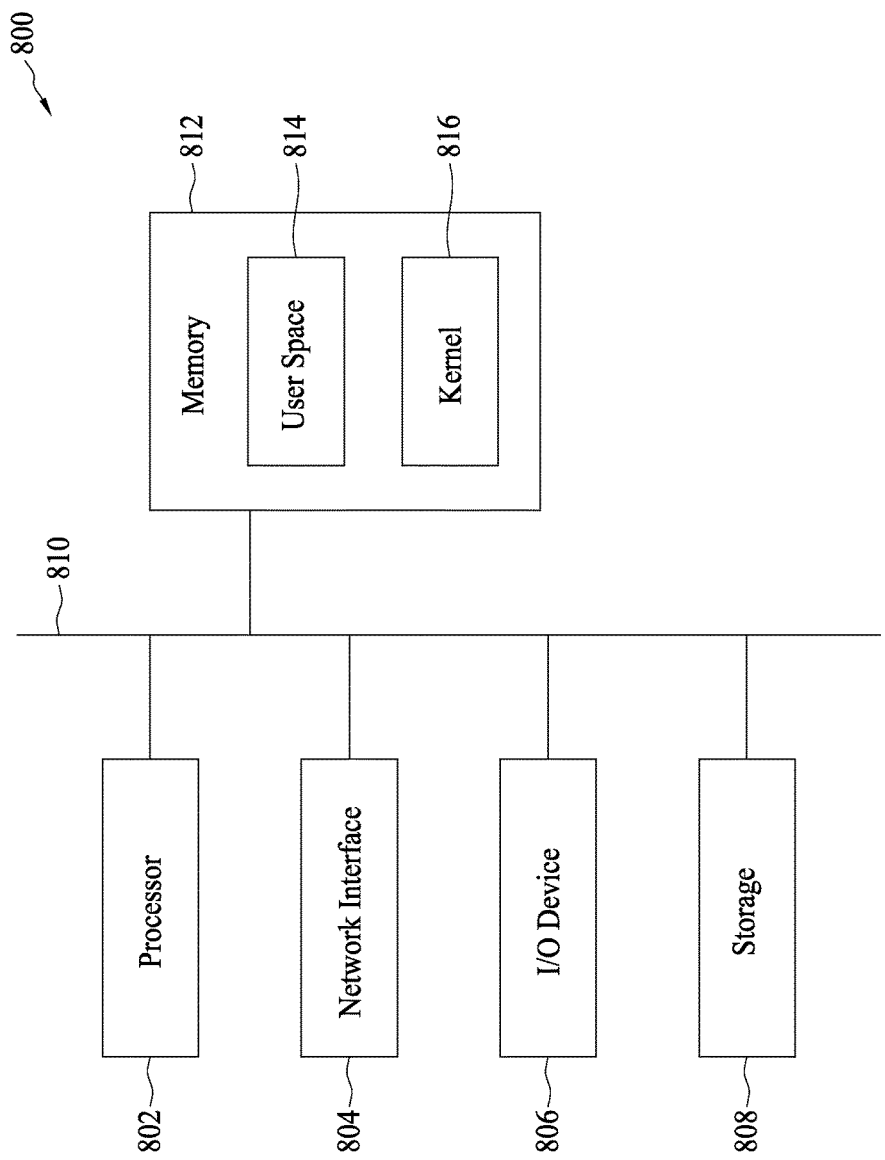

LAYOUT MODIFICATION METHOD AND SYSTEM

BACKGROUND

With the continual scaling of feature size and the ever-expanding functionalities of chips, the critical pitch of Mid-end-of-line (MEOL) in a semiconductor chip is also reduced. To fabricate such a small critical pitch, a large number of photomasks, or more simply masks, are required during the fabrication. Moreover, when the layout area of a circuit cell in the chip shrinks, electrical characteristics, such as resistance, of elements in the circuit cell are more likely to deviate from the desired characteristics after fabrication. The area shrinkage also causes poor performance of the circuit cell in electromagnetic (EM) immunity.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 8 is a block diagram of a hardware system for implementing a layout modification method and a layout modification system in accordance with some embodiments.

DETAILED DESCRIPTION

Figure 1:
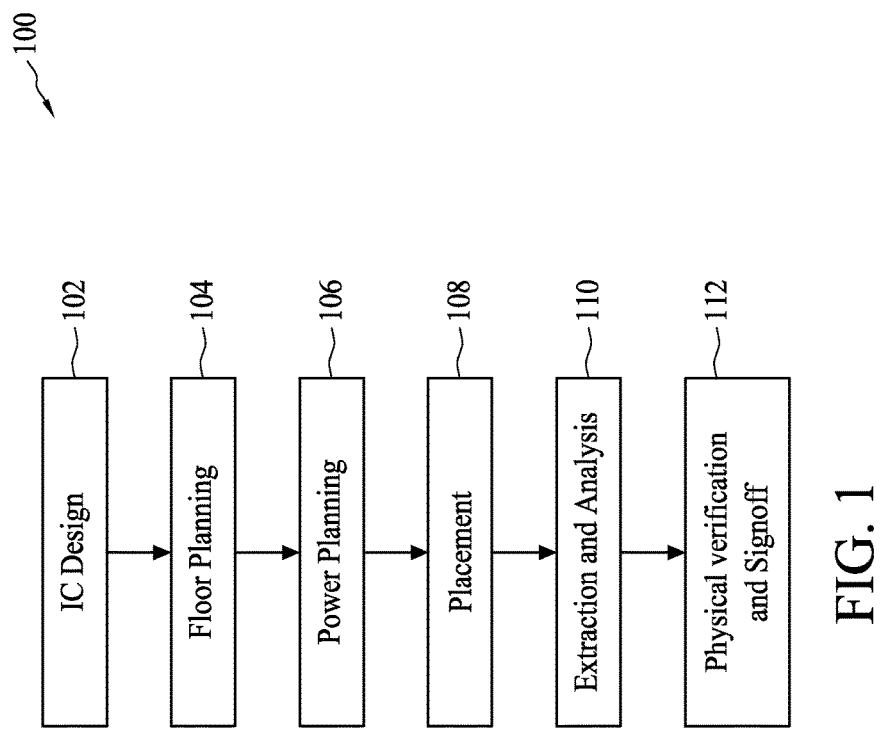
FIG. 1 is a flow chart of a design flow of an integrated circuit (IC) chip in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Embodiments of the present disclosure are discussed in detail below. It should be appreciated, however, that the present disclosure provides many applicable inventive concepts that can be embodied in a wide variety of specific contexts. The specific embodiments discussed are merely illustrative and do not limit the scope of the disclosure.

Further, spatially relative terms, such as "beneath," "below," "lower," "above," "upper", "lower", "left", "right" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly. It will be understood that when an element is referred to as being "connected to" or "coupled to" another element, it may be directly connected to or coupled to the other element, or intervening elements may be present.

FIG. 1 is a flow chart of a design flow 100 of an integrated circuit (IC) chip in accordance with some embodiments. The design flow 100 utilizes one or more electronic design automation (EDA) tools to carry out one or more operations in the design flow 100.

At an IC design stage 102, a high-level design of the IC chip is provided by a circuit designer. In some embodiments, a gate-level netlist is generated through logic synthesis based on the high-level design, and gates in the gate-level netlist are mapped to available cells in a standard cell library. The term "netlist" used herein refers to both a graphical-based representation, such as a schematic, and/or a text-based representation of a circuit.

At a floor planning stage 104, the gate-level netlist is partitioned into functional blocks and a floorplan for the functional blocks in a design layout of the IC chip is created.

At a power planning stage 106, power meshes such as a VDD power (e.g. the supply voltage) mesh and a VSS power (e.g. the ground voltage) mesh are routed. The power mesh includes several metal layers. Each metal layer includes power lines or power rails running, for example, horizontally or vertically. The metal layers are stacked such that any adjacent metal layers will have the power lines or power rails running in, for example, orthogonal directions.

At a placement stage 108, mapped cells of logic gates and registers in the blocks are placed at specific locations in the design layout.

At a parasitic extraction and analysis stage 110, the design layout, which includes the routing, is analyzed to extract the parasitics in the design layout and accordingly generate a physical netlist.

At a physical verification and signoff stage 112, a layout-versus-schematic (LVS) is performed on a physical netlist generated from the design layout in order to ensure correspondence of the design layout to the gate-level netlist. Further, a design rule check (DRC) is performed on the design layout in order to ensure the design is cleared of, for example, electrical issues and lithographic issues for manufacturing. Incremental fixing can be performed to achieve a final signoff of the IC chip design before tape-out.

In the process of fabricating an IC, multi-patterning technology may overcome the distortion or deviation on the geometric physical layout when the layout is lithographed by a single mask having a high density of patterns. Generally speaking, the multi-patterning technology includes a process of sequentially using a plurality of different masks, which have different patterns formed thereon, to photolithograph their different features on a layer of the substrate. Therefore, the multi-patterning technology can produce a number of desired features in comparison to the single patterning technology. However, the large amount of mask consumption may directly increase the cost of the IC.

Figure 2:
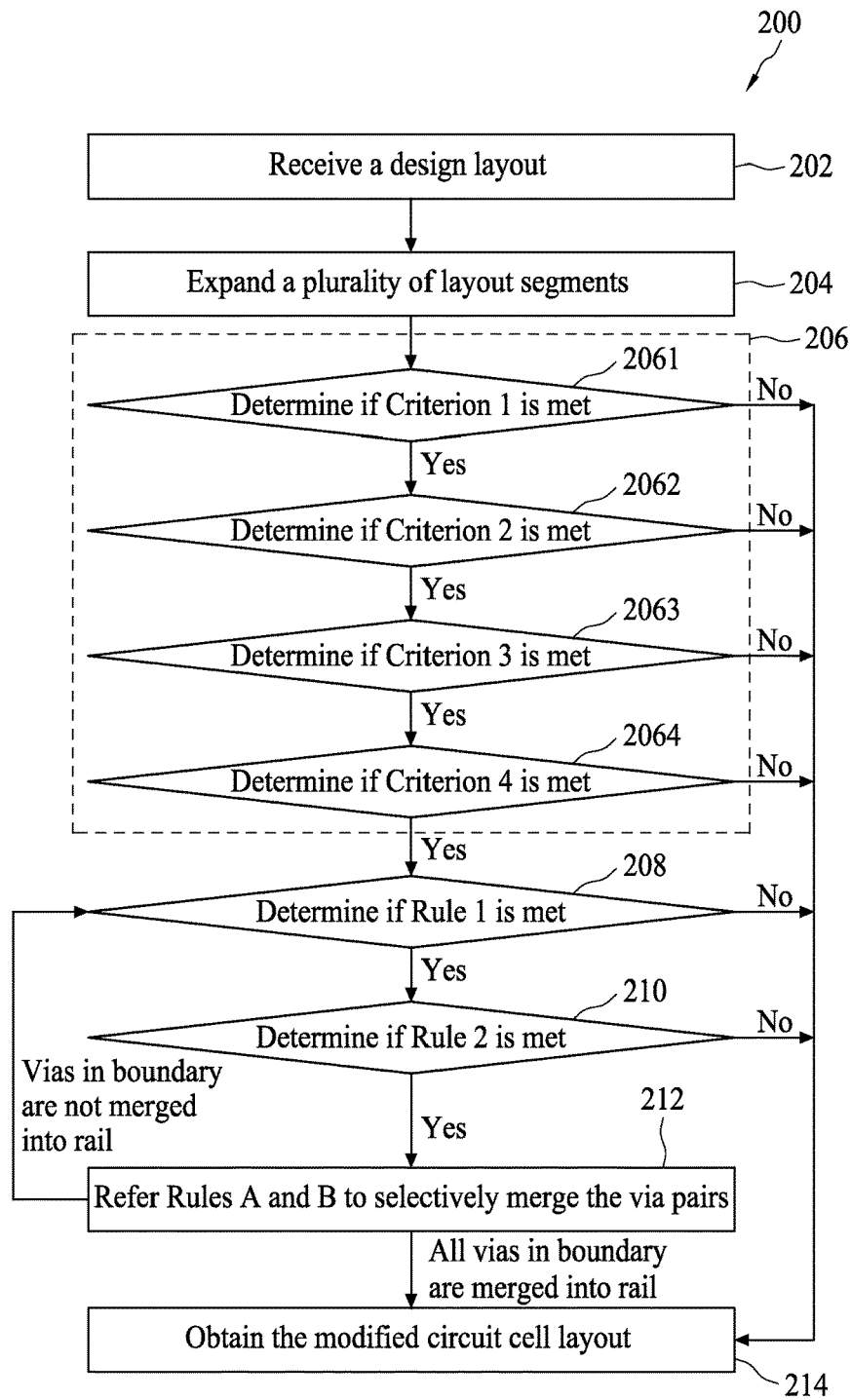
FIG. 2 is a flow diagram illustrating a layout modification method in accordance with some embodiments.

FIG. 2 is a flow diagram illustrating a layout modification method 200 in accordance with some embodiments. The layout modification method 200 may be applied to modifying the design layout of an integrated circuit (IC) so as to reduce the amount of mask consumption during the fabrication of the IC. In particular, the layout modification method 200 is applied to modifying the design layout of a plurality of specific layout segments of a circuit cell in the IC. The specific layout segment may be a via structure (hereinafter referred to as "via") of the circuit cell. The vias may be the contact-via and/or gate-via of the circuit cell. In some embodiments, the layout modification method 200 may be performed in the floor planning stage 104, the power planning stage 106, and/or the placement stage 108 of the design flow 100 described and illustrated in FIG. 1.

Referring to FIG. 2, in operation 202, a design layout of an integrated circuit is received.

In operation 204, a plurality of layout segments of a circuit cell in the design layout is expanded and/or displayed. The plurality of layout segments comprises a plurality of specific layout segments of the circuit cell. The plurality of specific layout segments may be a plurality of contact-vias, a plurality of gate-vias, a plurality of sources/drains, and/or a plurality of gates. A gate-via may be electrically coupled or directly connected to a gate while a contact-via may be electrically coupled or directly connected to a diffusion region such as a source region or drain region. A gate may be the control terminal of a transistor, while a contact may be the source terminal or drain terminal of a transistor. If a contact-via is electrically coupled to a source terminal, the contact-via is a source-via. If a contact-via is electrically coupled to a drain terminal, the contact-via is a drain-via. In addition, the plurality of contact-vias and the plurality of gate-vias may be in the same layer of the design layout. In particular, the plurality of contact-vias and the plurality of gate-vias are located in the first layer of the design layout. In other words, the plurality of contact-vias and the plurality of gate-vias are the first level vias in the design layout. However, this is not a limitation of the present embodiments.

In operation 206, allocation of the layout segments in the circuit cell layout is analyzed to, as will be further discussed in operations 2061 to 2064, determine the positions of gate-vias and source-vias in the circuit cell, determine a line width of the power line in the circuit cell layout, determine if a gate-via and a source-via in the circuit cell layout can be merged, and determine a minimum distance between two vias in the circuit cell layout. In operation 206, a plurality of gate-vias and source-vias near the cell boundary of the circuit cell are determined.

When the allocation of the layout segments is analyzed, a plurality of gate-vias and source-vias in the first layer of the circuit cell layout are first selected. Then, a cell boundary of the circuit cell layout is determined. In operation 2061, the gate-vias and source-vias located near the cell boundary are selected, i.e. Criterion 1. Specifically, the layout modification method 200, based on the distances between the cell boundary and each of the gate-vias and source-vias, determine which via is near the cell boundary. The distance may be measured from an edge of a via to the cell boundary or from the center of a via to the cell boundary. In some embodiments, when the distance between the cell boundary and a via falls within a distance range of about 0~4 times that of a via width, such as 4 times, the via is regarded as one near the cell boundary. The via width may be the minimum via width in the circuit cell layout. However, this is not a limitation of the present embodiments.

In operation 2062, the layout modification method 200 identifies the power line in the circuit cell layout, wherein the power line may be electrically coupled to a supply voltage or a ground voltage. Then, the layout modification method 200 measures the line width of the power line to determine if the line width falls within a width range, i.e. Criterion 2. In some embodiments, the width range may be 7.5~10 times that of a via width, such as 8 times, of a via width or the minimum via width in the circuit cell layout. If the line width falls within the width range, the layout modification method 200 proceeds to operation 2063. If the line width does not fall within the width range, the layout modification method 200 proceeds to operation 214.

For some semiconductor manufacturing processes, the gate-via and the source-via of a transistor can be merged into a merged via structure while some semiconductor manufacturing processes do not provide such service. Therefore, in operation 2063, the layout modification method 200 checks if a gate-via and a source-via in the circuit cell layout can be merged into a merged via structure during a semiconductor manufacturing process, i.e. Criterion 3. If the gate-via and the source-via can be merged, the layout modification method 200 proceeds to operation 2064. If the gate-via and the source-via cannot be merged, the layout modification method 200 proceeds to operation 214.

In operation 2064, the layout modification method 200 checks if a minimum distance between two vias in the circuit cell layout falls within a predetermined distance range, i.e. Criterion 4. In some embodiments, the predetermined distance range may be about a summation of 0.5~0.75 times that of a gate pitch and 0.85~1.05 times that of a gate length in the circuit cell layout. The gate pitch may be the minimum gate pitch between two adjacent gate lines in the circuit cell layout. The gate length may be the minimum gate length of a gate line in the circuit cell layout. For example, the predetermined distance range may be a summation of 0.6 that times of the minimum gate pitch and 0.9 times that of the minimum gate length. However, this is not a limitation of the present embodiments. If the minimum distance between two vias falls within the predetermined distance range, the layout modification method 200 proceeds to operation 208. If the minimum distance between two vias does not fall within the predetermined distance range, the layout modification method 200 proceeds to operation 214.

In other words, if all Criteria 1-4 checks pass, the layout modification method 200 proceeds to operation 208. If one of the Criteria 1-4 check fails, the layout modification method 200 proceeds to operation 214.

In operation 208, a vertical distance between two vias near the cell boundary is measured to determine if the vertical distance falls within a first distance range, i.e. Rule 1. In some embodiments, the first distance range may be about 4.5~5.5 times that of a via width in the circuit cell layout. The via width may be the minimum via width in the circuit cell layout. For example, the first distance range may be about 5 times that of the minimum via width. The layout modification method 200 selects via pairs having vertical distances that fall within the first distance range and proceeds to operation 210. If no vertical distance between two vias falls within the first distance range, the layout modification method 200 proceeds to operation 214.

In other words, if Rule 1 check passes, the layout modification method 200 proceeds to operation 210. If Rule 1 check fails, the layout modification method 200 proceeds to operation 214.

In operation 210, a horizontal distance between two vias near the cell boundary is measured to determine if the horizontal distance falls within a second distance range, i.e. Rule 2. In some embodiments, the second distance range may be about 6.5~7.5 times that of a via width in the circuit cell layout. The via width may be the minimum via width in the circuit cell layout. For example, the first distance range may be about 7 times that of the minimum via width. The layout modification method 200 selects all via pairs having the horizontal distances falling within the second distance range and proceeds to operation 212. If no horizontal distance between two vias falling within the second distance range, the layout modification method 200 proceeds to operation 214.

In other words, if Rule 2 check passes, the layout modification method 200 proceeds to operation 212. If Rule 2 check fails, the layout modification method 200 proceeds to operation 214.

After the operations 208 and 210, the via pairs, in which each via pair has a vertical distance falling within the first distance range and a horizontal distance falling within the second distance range, are obtained.

In operation 212, an evaluation is performed upon each via pair obtained in operation 210 in order to determine if the via pair can be merged into a merged via structure. The evaluation includes determining if the via pair is electrically coupled to the same signal level, i.e. Rule A. The minimum distance between two patterns on a mask used for fabricating two vias of the circuit cell layout is also measured in operation 212 in order to determine if the minimum distance falls within a distance range, i.e. Rule B. In some embodiments, the distance range may be about a summation of 1.8~2 times that of a gate pitch and 0.45~0.6 times that of a gate length in the circuit cell layout. The gate pitch may be the minimum gate pitch between two adjacent gate lines in the circuit cell layout. The gate length may be the minimum gate length of a gate line in the circuit cell layout. For example, the distance range may be about a summation of 2 times that of the minimum gate pitch and 0.5 times that of the minimum gate length in the circuit cell layout. However, this is not a limitation of the present embodiments. If the via pair is electrically coupled to the same signal level and the minimum distance of the mask falls within the distance range, the layout modification method 200 merges the via pair into a merged via structure. If the via pair are not electrically coupled to the same signal level, the layout modification method 200 does not merge the via pair and keeps the via pair intact. Then, the layout modification method 200 proceeds to operation 208 to continue the checking process.

In other words, the layout modification method 200 checks Rule A and Rule B to selectively merge a via pair. If the via pair passes Rule A and Rule B checks, the layout modification method 200 merges the via pair. If the via pair does not pass Rule A or Rule B check, the layout modification method 200 keeps the via pair intact and checks the next via pair.

Accordingly, the layout modification method 200 iteratively performs the operations 208-212 to check and merge the via(s) near the cell boundary of the circuit cell layout until all appropriate vias are merged into a rail. When all vias near the cell boundary are checked and merged according to the rules in operations 206-212, the layout modification method 200 proceeds to operation 214.

In operation 214, a modified circuit cell layout of the circuit cell is obtained, in which the vias conforming the rules in operations 206-212 are merged into a merged via structure or a rail.

According to the operations 202-214, some of the vias in the circuit cell layout are merged into a merged via structure. The size of the merged via structure is larger than that of the individual via structure not merged. After the fabrication, the merged via structure performs better than the individual via structure yet to be merged. For example, the via resistance or the voltage drop (also known as IR drop) of the merged via structure is smaller than that of the unmerged via structure. Moreover, the process variation of the merged via structure is smaller than that of the unmerged via structure. Furthermore, the merged via structure also has better electromagnetic (EM) immunity.

Figure 3:
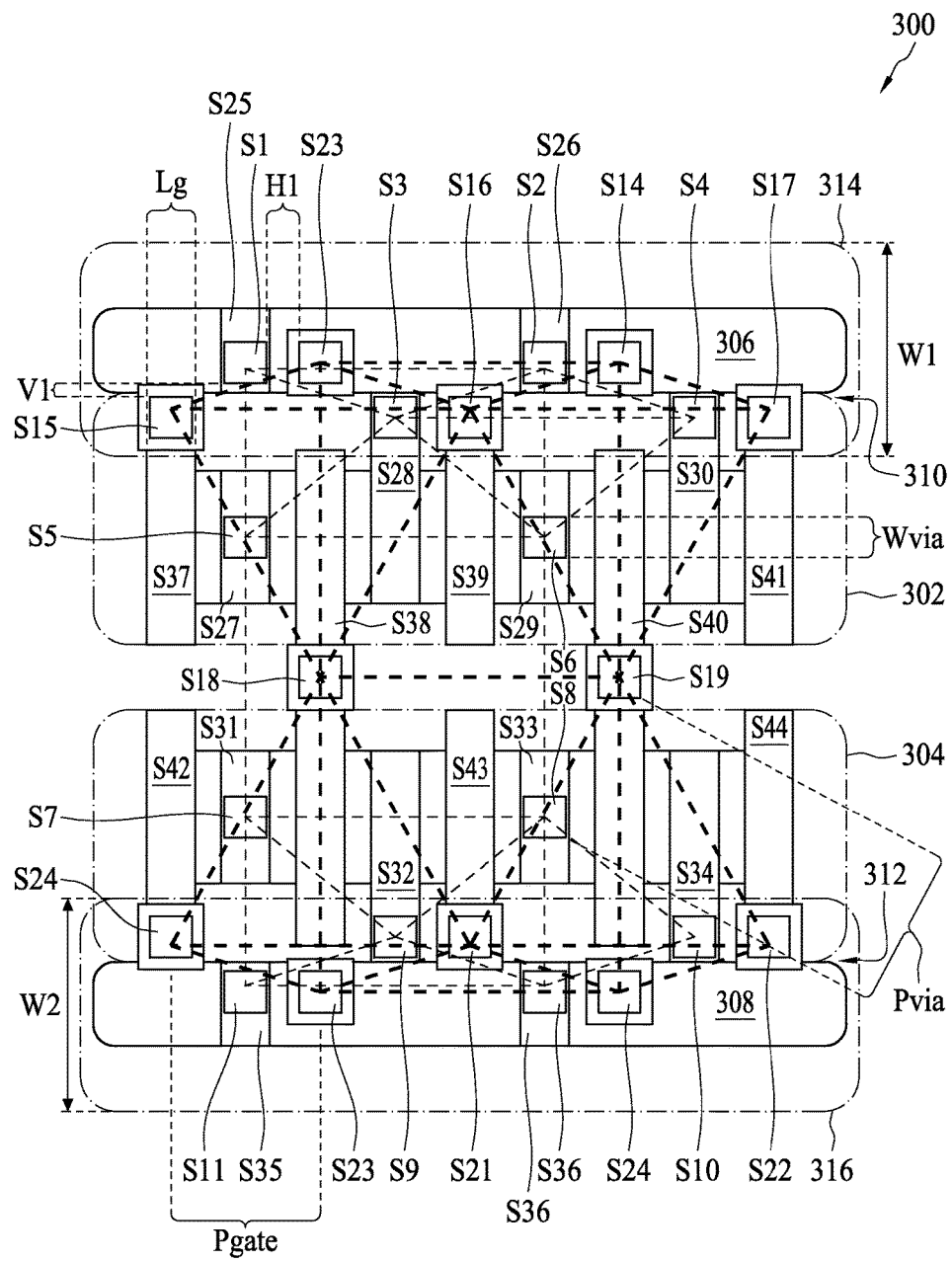
FIG. 3 is a schematic diagram of a circuit cell layout of a circuit cell on a layer of an integrated circuit in accordance with some embodiments.

In some embodiments, when all vias near the cell boundary are checked and merged according to the rules in operations 206-212, the mask consumption during the fabrication of the circuit cell also reduces. FIG. 3 is a schematic diagram of a circuit cell layout 300 of a circuit cell on the first layer of an IC in accordance with some embodiments. For illustrative purpose, the circuit cell layout 300 may be a portion of a layout on the first layer of the IC. The circuit cell layout 300 comprises a plurality of layout segments. In some embodiments, the plurality of layout segments comprises a plurality of contact-vias S1-S12, a plurality of gate-vias S13-S24, a plurality of sources/drains S25-S36, and a plurality of gates S37~S44. The circuit cell comprises a P-type region 302 and an N-type region 304. A first abutted cell 306 is adjacent to the P-type region 302. A second abutted cell 308 is adjacent to the N-type region 304. Accordingly, a first cell boundary 310 may be the boundary between the first abutted cell 306 and the P-type region 302, and a second cell boundary 312 may be the boundary between the second abutted cell 308 and the N-type region 304.

When the IC is fabricated under a semiconductor fabrication process, the spatial relationships among the plurality of contact-vias S1-S12 and the plurality of gate-vias S13-S24 should obey the multi-patterning layout rule when the plurality of contact-vias S1-S12 and the plurality of gate-vias S13-S24 are photolithographed by the multi-patterning technology. Basically, the multi-patterning technology is a technology using a plurality of masks to photolithograph the substrate of the wafer in succession for enhancing the feature density on a layer of the integrated circuit.

In some embodiments, for the circuit cell layout 300 prior to performing the layout modification method 200, the mask count used for fabricating or photolithographing the plurality of contact-vias S1-S12 and the plurality of gate-vias S13-S24 of the circuit cell is eight (8). When the spatial relationships among the plurality of contact-vias S1-S12 and the plurality of gate-vias S13-S24 are analyzed, a plurality of indicating lines are shown on the circuit cell layout 300. The bold dotted lines connect the plurality of contact-vias S1-S12, and the fine dotted lines connect the plurality of gate-vias S13-S24. Specifically, if two contact-vias are connected by a bold dotted line, the two contact-vias should not be photolithographed by the same mask. Further, if two gate-vias are connected by a fine dotted line, the two gate-vias should not be photolithographed by the same mask. Accordingly, to conform to the design rule of the multi-patterning photolithography, the contact-vias S2, S5, S8, and S11 are photolithographed by a first mask. The contact-vias S3 and S9 are photolithographed by a second mask. The contact-vias S1, S6, S7, and S12 are photolithographed by a third mask. The contact-vias S4 and S10 are photolithographed by a fourth mask. The gate-vias S13, S19, and S23 are photolithographed by a fifth mask. The gate-vias S14, S15, 20, and S24 are photolithographed by a sixth mask. The gate-vias S16 and S21 are photolithographed by a seventh mask. The gate-vias S17, S18, and S22 are photolithographed by an eighth mask.

Then, the circuit cell layout 300 can be modified by the layout modification method 200 to reduce the mask count. In operation 2061, the distance between the cell boundaries 310, 312 and the distance between each of the gate-vias S13-S24 and contact-vias S1-S12 are calculated to determine if the Criterion 1 is met. For brevity, it is assumed that the contact-vias S1-S12 are source-vias. In some embodiments, the distances between the cell boundary 310 and the vias S1-S4, S13-S17 fall within a distance range, such as 0~4 times that of a via width Wvia. The distances between the cell boundary 312 and the vias S9-S12, S20-S24 fall within the distance range. Therefore, the vias S1-S4, S13-S17, S9-S12, S20-S24 are determined to be ones near the cell boundary of the circuit cell. The via width Wvia is the length of a side, but is not limited to, of the square via as shown in FIG. 3.

In operation 2062, a first power line 314 and a second power line 316 are identified. The first power line 314 and the second power line 316 may be disposed substantially above the vias S1-S4, S13-S17, S9-S12, S20-S24. Moreover, the line widths W1, W2 of the power lines 314, 316 are checked to determine if the Criterion 2 is met. In some embodiments, the line widths W1, W2 of the power lines 314, 316 fall within the width range of about 7.5~10 times that of the via width Wvia.

In some embodiments, it is assumed that the Criterion 3 check passes in operation 2063. This means the semiconductor manufacturing process used for fabricating the circuit cell layout 300 provides the service to merge a gate-via and a source-via into a merged via structure.

In operation 2064, the minimum distance Pvia between two vias in the circuit cell layout 300 is measured to determine if the Criterion 4 check passes. The minimum distance Pvia is the center-to-center distance between a via and an adjacent via. However, this is not a limitation of the present embodiments. The minimum distance Pvia may be an edge-to-edge distance between a via and an adjacent via. In some embodiments, the minimum distance Pvia falls within the predetermined distance range of about a summation of 0.5~0.75 times that of a gate pitch and 0.85~1.05 times that of the minimum gate length Lg.

Then, in operation 208, the vertical distances between two vias among the vias S1-S4, S13-S17, S9-S12, S20-S24 are measured to determine if the Rule 1 check passes. For example, the vertical distance between the vias S1 and S15 is V1. The vertical distance V1 is measured from an edge of the via S1 to an edge of the via S15. However, this is not a limitation of the present embodiments. The vertical distance V1 may be measured from the center of the via S1 to the center of the via S15. When all the vertical distances between two vias are obtained, the layout modification method 200 can determine which via pair has a vertical distance that falls within the first distance range of about 4.5~5.5 times that of the via width Wvia. In some embodiments, the vias S1-S4, S13-S17 located at the upper side of the circuit cell layout 300 have vertical distances falling within the first distance range. The vias S9-S12, S20-S24 located at the lower side of the circuit cell layout 300 have vertical distances falling within the first distance range.

Then, in operation 210, the horizontal distances between two vias among the vias S1-S4, S13-S17, S9-S12, S20-S24 are measured to determine if the Rule 2 check passes. For example, the horizontal distance between the vias S1 and S13 is H1. The horizontal distance H1 is measured from an edge of the via S1 to an edge of the via S13. However, this is not a limitation of the present embodiments. The horizontal distance H1 may be measured from the center of the via S1 to the center of the via S13. When all the horizontal distances between two vias are obtained, the layout modification method 200 can determine which via pair has a horizontal distance that falls within the second distance range of about 6.5~7.5 times that of the via width Wvia. In some embodiments, for the upper side of the circuit cell layout 300, the via pairs S15 and S1, S1 and S13, S13 and S3, S3 and S16, S16 and S2, S2 and S14, S14 and S4, S4 and S17 have horizontal distances falling within the second distance range. For the lower side of the circuit cell layout 300, the via pairs S24 and S11, S11 and S23, S23 and S9, S9 and S21, S21 and S12, S12 and S24, S24 and S10, S10 and S22 have horizontal distances falling within the second distance range.

After operations 208 and 210, the via pairs having vertical distances within the first distance range and having horizontal distances within the second distance range are obtained.

In operation 212, for each via pair having a vertical distance within the first distance range and having a horizontal distance within the second distance range, the layout modification method 200 determines if the via pair is electrically coupled to the same signal level (i.e. Rule A), and determines if the distance between two via patterns on a mask used for fabricating the via pair falls within a distance range of about a summation of 1.8~2 times that of the gate pitch Pgate and 0.45~0.6 times that of the gate length Lg (i.e. Rule B). The gate pitch Pgate is measured from the center of a gate to the center of an adjacent gate. However, this is not a limitation of the present embodiments. The gate pitch Pgate may be measured from an edge of a gate to an edge of an adjacent gate. When the via pair passes the Rule A and Rule B checks, the via pair is merged into a merged via structure. In some embodiments, the vias pairs S1 and S13, S2 and S14, S3 and S16, S4 and S17, S9 and S21, S10 and S22, S11 and S23, S12 and S24 pass the Rule A and Rule B checks. Therefore, the vias pairs S1 and S13, S2 and S14, S3 and S16, S4 and S17, S9 and S21, S10 and S22, S11 and S23, S12 and S24 are merged into the merged via structures Sm1-Sm8 respectively as shown in FIG. 4.

Figure 4:
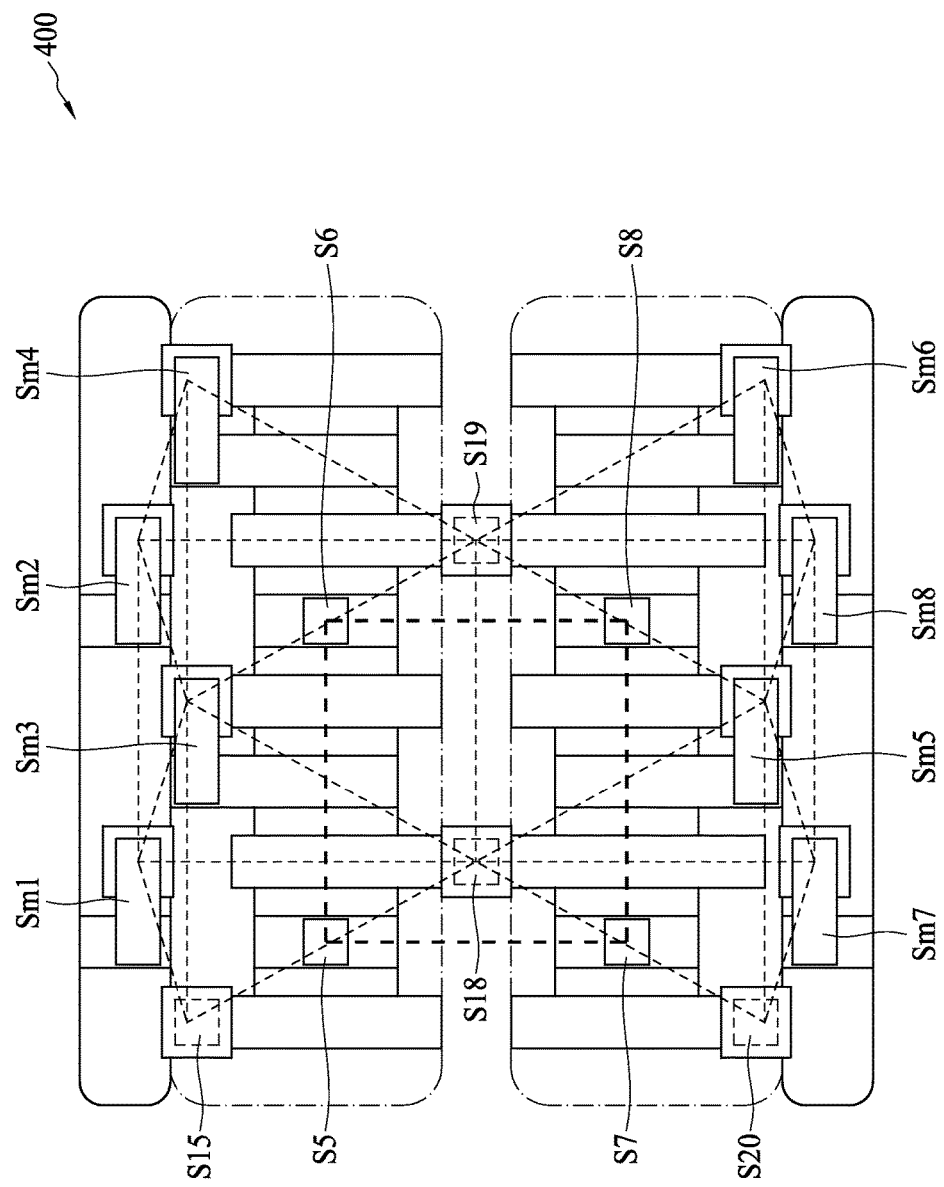
FIG. 4 is a schematic diagram of a modified circuit cell layout of a circuit cell on a layer of an integrated circuit in accordance with some embodiments.

FIG. 4 is a schematic diagram of a modified circuit cell layout 400 of the circuit cell on the first layer of the IC in accordance with some embodiments. In some embodiments, when the vias pairs S1 and S13, S2 and S14, S3 and S16, S4 and S17, S9 and S21, S10 and S22, S11 and S23, S12 and S24 in the circuit cell layout 300 are merged into the merged via structures Sm1-Sm8 respectively, the mask count used for fabricating or photolithographing the vias S5-S8, S15, S18-S20, and Sm1-Sm8 is reduced to six (6). When the spatial relationships among the vias S5-S8, S15, S18-S20, and Sm1-Sm8 are analyzed, a plurality of indicating lines are shown on the circuit cell layout 400. The bold dotted lines connect the plurality of vias S5-S8, and the fine dotted lines connect the plurality of vias S15, S18-20, Sm1-Sm8. It is noted that, for brevity, the other similar notations are omitted in FIG. 4. Specifically, if two vias are connected by a bold dotted line, the two vias should not be photolithographed by the same mask. Moreover, if two vias are connected by a fine dotted line, the two vias should not be photolithographed by the same mask. Accordingly, to conform to the design rule of the multi-patterning photolithography, the vias S5 and S8 are photolithographed by a first mask. The vias S6 and S7 are photolithographed by a second mask. The vias Sm1, S19, and Sm7 are photolithographed by a third mask. The vias Sm3 and Sm5 are photolithographed by a fourth mask. The vias Sm2 and Sm8 are photolithographed by a fifth mask. The vias S15, Sm4, S20, and Sm6 are photolithographed by a sixth mask.

It is noted that when a first via and a second via are merged into a merged via structure, the original first and second vias (e.g. S1 and S13) may be located underneath the merged via structure (e.g. Sm1), and the original first and second vias may not be seen from the top view of the circuit cell layout. Therefore, the vias pairs S1 and S13, S2 and S14, S3 and S16, S4 and S17, S9 and S21, S10 and S22, S11 and S23, S12 and S24 are not shown in FIG. 4. In other words, the merged via structure (e.g. Sm1) may be regarded as a structure configured to electrically couple the first and second vias (e.g. S1 and S13).

Then, the circuit cell layout 400 can be modified by the operations 208-212 of the layout modification method 200 to further reduce the mask count. Similar to the circuit cell layout 300, in operation 208, the vertical distances between two vias among the vias S5-S8, S15, S18-S20, and Sm1-Sm8 are measured.

Then, in operation 210, the horizontal distances between two vias among the vias S5-S8, S15, S18-S20, and Sm1-Sm8 are measured.

After operations 208 and 210, the via pairs having vertical distances within the first distance range and having horizontal distances within the second distance range are obtained.

In operation 212, for each via pair having a vertical distance within the first distance range and having a horizontal distance within the second distance range, the layout modification method 200 determines if the via pair follows the above mentioned Rule A and Rule B. If the via pair passes Rule A and Rule B checks, the via pair is merged into a merged via structure.

Figure 5:
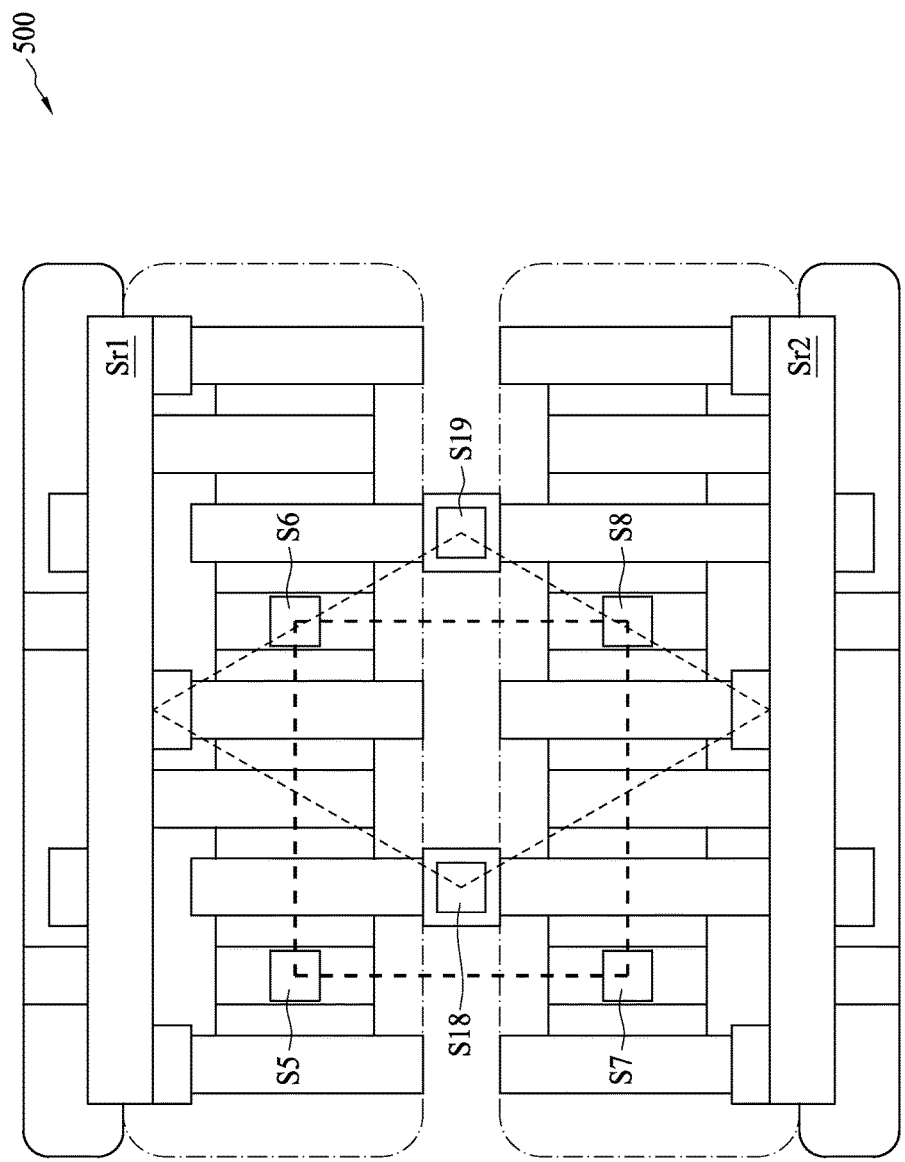
FIG. 5 is a schematic diagram of a modified circuit cell layout of a circuit cell on a layer of an integrated circuit in accordance with some embodiments.

In some embodiments, the layout modification method 200 iteratively performs the operations 208-212 to check and merge the via(s) near the cell boundary of the circuit cell layout 400 until all candidate vias are merged into a rail as shown in FIG. 5. FIG. 5 is a schematic diagram of a circuit cell layout 500 of the circuit cell on the first layer of the IC in accordance with some embodiments. Referring to FIG. 5, the vias S5 and Sm1-Sm4 in the circuit cell layout 400 are merged into a first via rail (or simplified as a rail) Sr1, and the vias S20 and Sm5-Sm8 in the circuit cell layout 400 are merged into a second via rail Sr2. Accordingly, the mask count used for fabricating or photolithographing the vias S5-S8, S18-S19, Sr1, and Sr2 is reduced to five (5). It is noted that, for brevity, other similar notations are omitted in FIG. 5.

In particular, when the spatial relationships among the vias S5-S8, S18-S19, Sr1, and Sr2 are analyzed, a plurality of indicating lines are shown on the circuit cell layout 500. The bold dotted lines connect the plurality of vias S5-S8, and the fine dotted lines connect the plurality of vias S18-S19, Sr1, and Sr2. Specifically, if two vias are connected by a bold dotted line, the two vias should not be photolithographed by the same mask. Moreover, if two vias are connected by a fine dotted line, the two vias should not be photolithographed by the same mask. Accordingly, to conform to the design rule of the multi-patterning photolithography, the vias Sr1 and Sr2 are photolithographed by a first mask. The vias S5 and S8 are photolithographed by a second mask. The vias S6 and S7 are photolithographed by a third mask. The via S19 is photolithographed by a fourth mask. The via S18 is photolithographed by a fifth mask.

As a result, after the circuit cell layout 300 is processed by the layout modification method 200, the vias S1-S4 and S13-S17 in the upper side of the circuit cell layout 300 are merged into the first via rail Sr1, and the vias S9-S12 and S20-S24 in the lower side of the circuit cell layout 300 are merged into the second via rail Sr2. Therefore, the layout modification method 200 may simplify the circuit cell layout of a circuit cell and reduce the mask count for fabricating the circuit cell. Moreover, the via rail Sr1 (or Sr2) has smaller via resistance and smaller process variation. The via rail Sr1 (or Sr2) also has better electromagnetic (EM) immunity.

Figure 6:
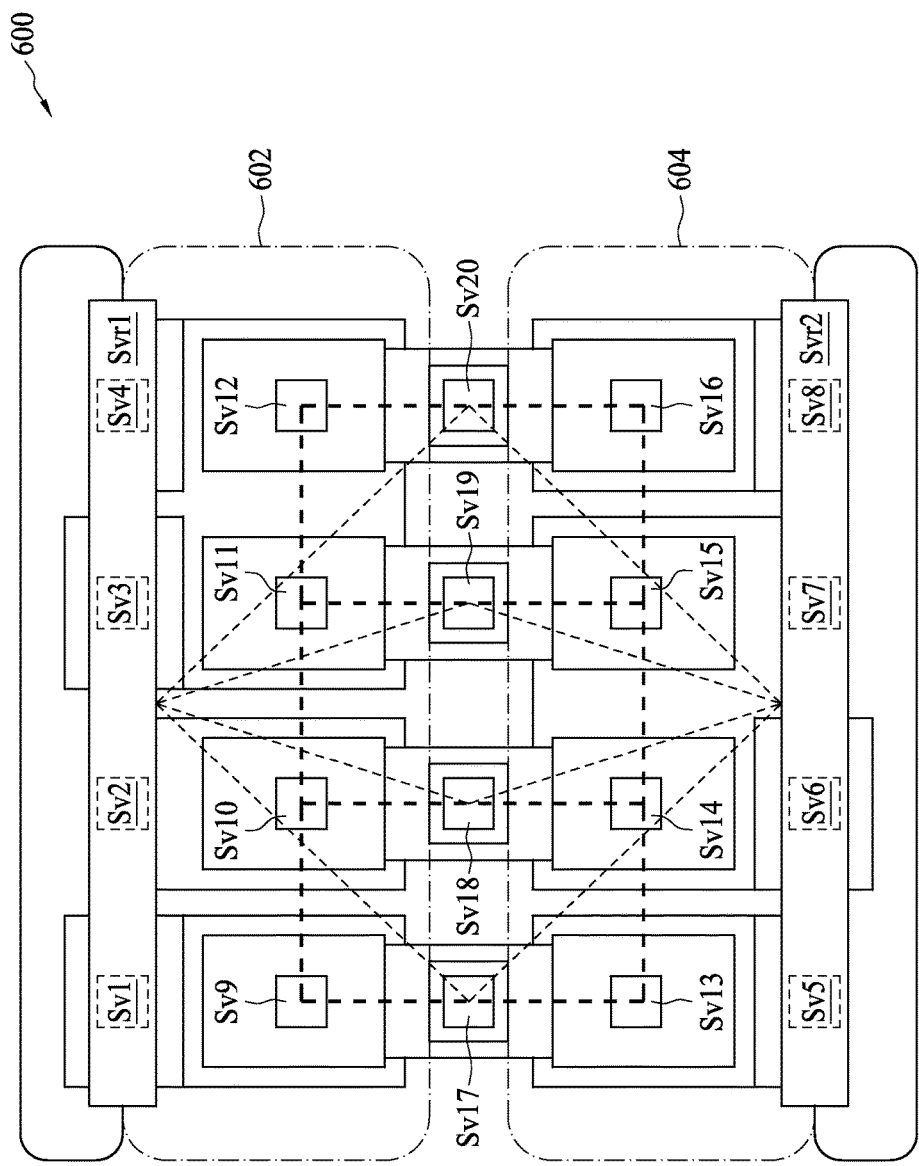
FIG. 6 is a schematic diagram of a modified circuit cell layout of a vertical circuit cell on a layer of an integrated circuit in accordance with some embodiments.

It is noted that the above circuit cell layout 300 is the layout of a multi-gate device, but this is not a limitation of the present embodiments. The layout modification method 200 also has similar benefits when the layout modification method 200 is applied to the layout of a vertical device. FIG. 6 is a schematic diagram of a circuit cell layout 600 of a vertical circuit cell on the first layer of an IC in accordance with some embodiments. The circuit cell layout 600 has been modified by the layout modification method 200. The vertical circuit cell comprises a P-type region 602 and an N-type region 604. In some embodiments, the vias Sv1-Sv4 located at the upper cell boundary of the circuit cell layout 600 are merged into a first via rail Svr1, and the vias Sv5-Sv8 located at the lower cell boundary of the circuit cell layout 600 are merged into a second via rail Svr2. Therefore, when the spatial relationships among the first via rail Svr1, the second via rail Svr2, the plurality of contact-vias Sv9-Sv16, and the plurality of gate-vias Sv17-Sv18 are analyzed, a plurality of indicating lines are shown on the circuit cell layout 600. The bold dotted lines connect the plurality of contact-vias Sv9-Sv16 and the plurality of gate-vias Sv17-Sv20. The fine dotted lines connect the first via rail Svr1, the second via rail Svr2, and the plurality of gate-vias Sv17-Sv18. Specifically, if two vias are connected by a bold dotted line, the two vias should not be photolithographed by the same mask. If two vias are connected by a fine dotted line, the two vias should not be photolithographed by the same mask. Accordingly, to conform to the design rule of the multi-patterning photolithography, the first via rail Svr1 and the second via rail Svr2 are photolithographed by a first mask. The contact-vias Sv9, Sv11, Sv14, and Sv16 are photolithographed by a second mask. The contact-vias Sv10, Sv12, Sv13, and Sv15 are photolithographed by a third mask. The gate-vias Sv17 and Sv19 are photolithographed by a fourth mask. The gate-vias Sv18 and Sv20 are photolithographed by a fifth mask. The operations to modify the circuit cell layout 600 are similar to the above operations performed upon the circuit cell layout 300, and thus the detailed description is omitted here for brevity.

Figure 7:
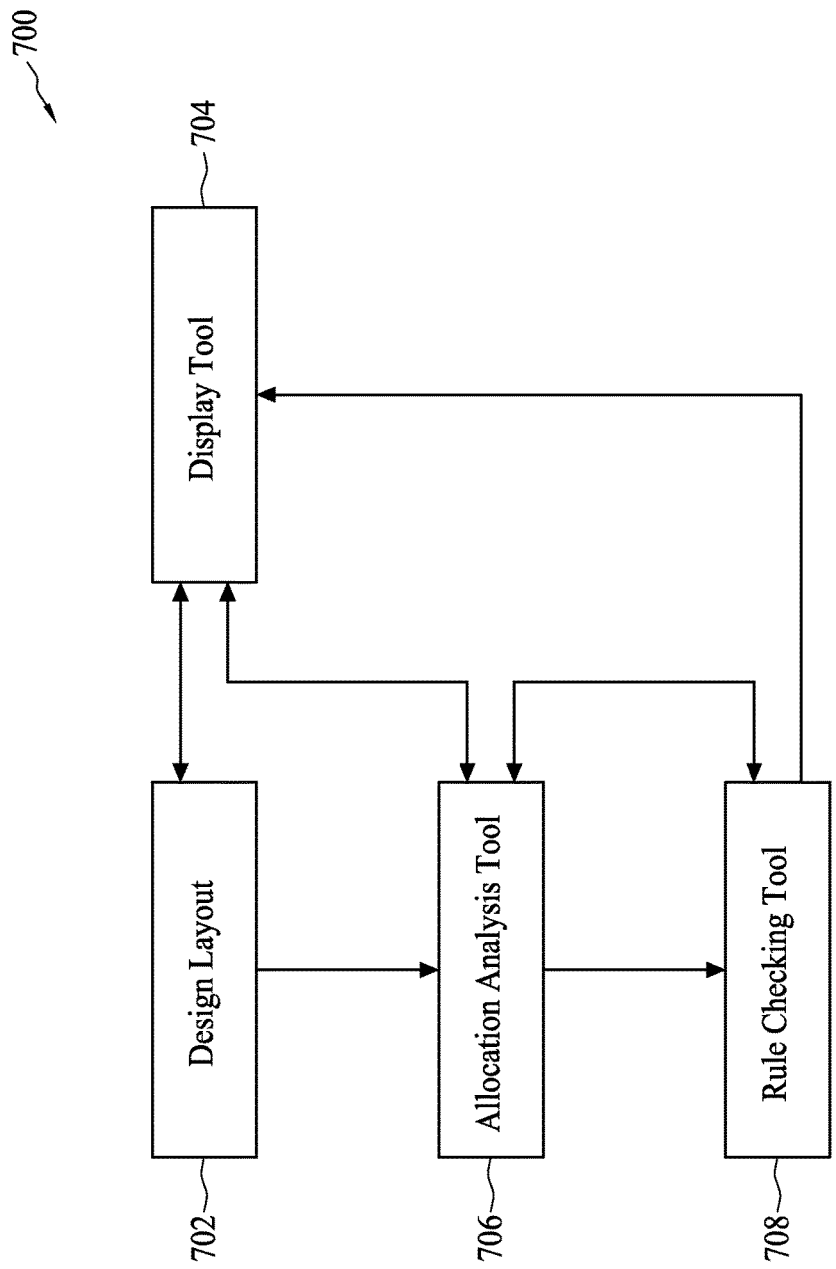
FIG. 7 is a functional block diagram of a layout modification system in accordance with some embodiments.

FIG. 7 is a functional block diagram of a layout modification system 700 in accordance with some embodiments. In some embodiments, the layout modification system 700 includes an allocation analysis tool 706 and a rule checking tool 708. The space analysis tool 2406 receives a design layout 702 of an integrated circuit. The display tool 704 is configured to display the plurality of layout segments in the layer of the integrated circuit. The allocation analysis tool 706 is configured to perform the measurements in operations 2061, 2062, 2064, 208, 210, and 212. The allocation analysis tool 706 is configured to perform the measurements in operations 2061, 2062, 2064, 208, 210, and 212. The rule checking tool 708 is configured to perform the checks in operations 2061, 2062, 2063, 2064, 208, 210, and 212. The display tool 704 is further configured to display the modified circuit cell layout of the integrated circuit.

FIG. 8 is a block diagram of a hardware system 800 for implementing the layout modification method described with reference to FIG. 2 and the layout modification system 700 described with reference to FIG. 7, in accordance with some embodiments. The system 800 includes at least one processor 802, a network interface 804, an input and output (I/O) device 806, a storage 808, a memory 812, and a bus 810. The bus 810 couples the network interface 804, the I/O device 806, the storage 808 and the memory 812 to the processor 802.

In some embodiments, the memory 812 comprises a random access memory (RAM) and/or other volatile storage device and/or read only memory (ROM) and/or other non-volatile storage device. The memory 812 includes user space 814 and a kernel 816, configured to store program instructions to be executed by the processor 802 and data accessed by the program instructions.

In some embodiments, the network interface 804 is configured to access program instructions and data accessed by the program instructions stored remotely through a network. The I/O device 806 includes an input device and an output device configured for enabling user interaction with the system 800. The input device comprises, for example, a keyboard, a mouse, etc. The output device comprises, for example, a display, a printer, etc. The storage device 808 is configured for storing program instructions and data accessed by the program instructions. The storage device 808 comprises, for example, a magnetic disk and an optical disk.

In some embodiments, for executing the program instructions, the processor 802 is configured to perform method embodiments described with reference to FIG. 2 and software system embodiments described with reference to FIG. 7.

In some embodiments, the program instructions are stored in a non-transitory computer readable recording medium such as one or more optical disks, hard disks and non-volatile memory devices.

In some embodiments, a layout modification method performed by at least one processor is provided. The layout modification method comprises: analyzing, by the at least one processor, allocation of a plurality of specific layout segments of a circuit cell layout to determine a first specific layout segment and a second specific layout segment from the plurality of specific layout segments; determining, by the at least one processor, if the first specific layout segment and the second specific layout segment are coupled to a first signal level; and merging, by the at least one processor, the first specific layout segment and the second specific layout segment into a first merged layout segment when the first specific layout segment and the second specific layout segment are coupled to the first signal level.

In some embodiments, a circuit cell layout is provided. The circuit cell layout comprises a plurality of specific layout segments and a merged layout segment. The merged layout segment is disposed on a cell boundary of the circuit cell layout for electrically coupling a first specific layout segment and a second specific layout segment in the plurality of specific layout segments. The first specific layout segment and the second specific layout segment are coupled to a same signal level.

In some embodiments, a non-transitory computer-readable storage medium storing program instructions that when executed by a computer cause the computer to perform a layout modification method is provided. The layout modification method comprises: analyzing, by the at least one processor, allocation of a plurality of specific layout segments of a circuit cell layout to determine a first specific layout segment and a second specific layout segment from the plurality of specific layout segments; determining, by the at least one processor, if the first specific layout segment and the second specific layout segment are coupled to a first signal level; and merging, by the at least one processor, the first specific layout segment and the second specific layout segment into a first merged layout segment when the first specific layout segment and the second specific layout segment are coupled to the first signal level.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method of forming an integrated circuit, the method comprising:

analyzing, by the at least one processor, at least dimensional and positional characteristics of a plurality of specific layout segments of a circuit cell layout to determine a cell boundary of the circuit cell layout, wherein the cell boundary is a boundary between the circuit cell layout and an adjacent cell abutted to the circuit cell layout;

selecting at least a first specific layout segment and a second specific layout segment from the plurality of specific layout segments based on a first distance between the first specific layout segment and the cell boundary and a second distance between the second specific layout segment and the cell boundary;

determining, by the at least one processor, if the first specific layout segment and the second specific layout segment are electrically connected to a first reference voltage level;

merging, by the at least one processor, the first specific layout segment and the second specific layout segment to form a first merged layout segment when the first specific layout segment and the second specific layout segment are electrically connected to the first reference voltage level;

selecting at least a third specific layout segment and a fourth specific layout segment from the plurality of specific layout segments in response to said analyzing;

merging, by the at least one processor, the third specific layout segment and the fourth specific layout segment to form a second merged layout segment;

merging, by the at least one processor, the first merged layout segment and the second merged layout segment to form a rail;

generating a modified circuit cell layout based on the rail; and causing the integrated circuit to be fabricated according to the modified circuit cell layout.

2. The method of claim 1, further comprising:
  determining, by the at least one processor, if the third specific layout segment and the fourth specific layout segment are electrically connected to a second reference voltage level;
  merging, by the at least one processor, the third specific layout segment and the fourth specific layout segment to form the second merged layout segment when the third specific layout segment and the fourth specific layout segment are electrically connected to the second reference voltage level;
  determining, by the at least one processor, if the first merged layout segment and the second merged layout segment are electrically connected to a third reference voltage level; and
  merging, by the at least one processor, the first merged layout segment and the second merged layout segment to form the rail when the first merged layout segment and the second merged layout segment are electrically connected to the third reference voltage level.

3. The method of claim 2, wherein the first reference voltage level, the second reference voltage level, and the third reference voltage level are the same reference voltage level.

4. The method of claim 1, wherein the plurality of specific layout segments is a plurality of via structures.

5. The method of claim 1, wherein the first distance and the second distance fall within a distance range of about 0~4 times that of a via width in the circuit cell layout.

6. The method of claim 1, wherein analyzing the at least dimensional and positional characteristics of the plurality of specific layout segments of the circuit cell layout to the first specific layout segment and the second specific layout segment from the plurality of specific layout segments further comprises:
  identifying a power line in the circuit cell layout;
  determining if a line width of the power line falls within a width range;
  wherein the power line is electrically connected to a supply voltage, and the width range is about 7.5~10 times that of a via width in the circuit cell layout.

7. The method of claim 1, wherein analyzing the allocation of the plurality of specific layout segments of the circuit cell layout further comprises:
  determining if the first specific layout segment can be merged with the second specific layout segment during a semiconductor manufacturing process.

8. The method of claim 1, wherein analyzing the allocation of the plurality of specific layout segments of the circuit cell layout further comprises:
  determining if a minimum distance between two specific layout segments in the plurality of specific layout segments falls within a distance range;
  wherein the distance range is about a summation of 0.5~0.75 times that of a gate pitch and 0.85~1.05 times that of a gate length in the circuit cell layout.

9. The method of claim 1, further comprising:
  determining if a vertical distance between the first specific layout segment and the second specific layout segment falls within a first distance range; and
  determining if a horizontal distance between the first specific layout segment and the second specific layout segment falls within a second distance range;
  wherein the first distance range is different from the second distance range.

10. The method of claim 9, wherein the first distance range is about 4.5~5.5 times that of a via width in the circuit cell layout, and the second distance range is about 6.5~7.5 times that of the via width.

11. The method of claim 1, wherein determining if the first specific layout segment and the second specific layout segment are electrically connected to the first reference voltage level further comprises:
  determining if a minimum distance between two patterns on a mask used for fabricating two specific layout segments in the plurality of specific layout segments falls within a distance range;
  wherein the distance range is about a summation of 1.8~2 times that of a gate pitch and 0.45~0.6 times that of a gate length in the circuit cell layout.

12. A non-transitory computer-readable storage medium storing program instructions that when executed by a computer cause the computer to perform a method of forming an integrated circuit, the method comprising:
  analyzing, by the at least one processor, at least dimensional and positional characteristics of a plurality of specific via structures of a circuit cell layout to determine a cell boundary of the circuit cell layout, wherein the cell boundary is a boundary between the circuit cell layout and an adjacent cell abutted to the circuit cell layout;
  selecting at least a first specific via structure and a second specific via structure from the plurality of specific via structures based on a first distance between the first specific via structure and the cell boundary and a second distance between the second specific via structure and the cell boundary;
  determining, by the at least one processor, if the first specific via structure and the second specific via structure are electrically connected to a first reference voltage level;
  merging, by the at least one processor, the first specific via structure and the second specific via structure to form a first merged via structure when the first specific via structure and the second specific via structure are electrically connected to the first reference voltage level;
  selecting at least a third specific via structure and a fourth specific via structure from the plurality of specific via structures in response to said analyzing;
  merging, by the at least one processor, the third specific via structure and the fourth specific via structure to form a second merged via structure;
  merging, by the at least one processor, the first merged via structure and the second merged via structure to form a rail;
  generating a modified circuit cell layout based on the rail; and
  causing the integrated circuit to be fabricated according to the modified circuit cell layout.

13. The non-transitory computer-readable storage medium of claim 12, wherein the method further comprises:
  determining, by the at least one processor, if the third specific via structure and the fourth specific via structure are electrically connected to a second reference voltage level;
  merging, by the at least one processor, the third specific via structure and the fourth specific via structure to form the second merged via structure when the third specific via structure and the fourth specific via structure are electrically connected to the second reference voltage level;

determining, by the at least one processor, if the first merged via structure and the second merged via structure are electrically connected to a third reference voltage level; and merging, by the at least one processor, the first merged via structure and the second merged via structure to form the rail when the first merged via structure and the second merged via structure are electrically connected to the third reference voltage level.

14. A method of forming an integrated circuit, the method comprising:

providing a first circuit cell, having a cell boundary;

providing a second circuit cell, abutted to the cell boundary of the first circuit cell;

disposing a plurality of specific layout segments on the first circuit cell and the second circuit cell;

selecting at least a first specific layout segment and a second specific layout segment from the plurality of specific layout segments based on a first distance between the first specific layout segment and the cell boundary and a second distance between the second specific layout segment and the cell boundary;

determining if a vertical distance between the first specific layout segment and the second specific layout segment falls within a first distance range;

determining if a horizontal distance between the first specific layout segment and the second specific layout segment falls within a second distance range;

merging the first specific layout segment and the second specific layout segment to form a first merged layout segment;

disposing a power line on the first merged layout segment to form a modified circuit cell layout; and causing the integrated circuit to be fabricated according to the modified circuit cell layout.

15. The method of claim 14, further comprising:

determining if the first specific layout segment and the second specific layout segment are electrically connected to a first reference voltage level; and merging the first specific layout segment and the second specific layout segment to form the first merged layout segment when the first specific layout segment and the second specific layout segment are electrically connected to the first reference voltage level.

16. The method of claim 14, wherein the plurality of specific layout segments is a plurality of via structures.

17. The method of claim 16, wherein the first distance and the second distance fall within a distance range of about 0~4 times that of a via width of a via structure in the plurality of via structures.

18. The method of claim 16, further comprising:

determining if a line width of the power line falls within a width range;

wherein the power line is electrically connected to a supply voltage, and the width range is about 7.5~10 times that of a via width of a via structure in the plurality of via structures.

19. The method of claim 16, wherein the first distance range is different from the second distance range.

20. The method of claim 19, wherein the first distance range is about 4.5~5.5 times that of a via width of a via structure in the plurality of via structures, and the second distance range is about 6.5~7.5 times that of the via width.

* * * * *